United States Patent
Ma

(10) Patent No.: US 10,088,855 B2
(45) Date of Patent: Oct. 2, 2018

(54) CORRECTED TEMPERATURE SENSOR MEASUREMENT

(71) Applicant: Infineon Technologies AG, Neubiberg (DE)

(72) Inventor: Fan Yung Ma, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 583 days.

(21) Appl. No.: 14/710,802

(22) Filed: May 13, 2015

(65) Prior Publication Data

US 2016/0336947 A1    Nov. 17, 2016

(51) Int. Cl.
  *G01K 7/01*     (2006.01)
  *G05F 1/46*     (2006.01)
  *G01K 7/21*     (2006.01)

(52) U.S. Cl.
  CPC .............. *G05F 1/463* (2013.01); *G01K 7/01* (2013.01); *G01K 7/21* (2013.01); *G01K 2219/00* (2013.01)

(58) Field of Classification Search
  CPC ............ G01K 7/02; G01K 3/005; G01K 3/10; G01K 7/42; G01K 7/22; G01K 13/02; G01K 2205/04; G01K 7/16; G01K 7/01; G01K 7/10; G01K 11/32; G01K 13/00; G01K 2013/024; H01R 4/023; H01R 4/029; H01R 43/28; B23K 31/02; G01F 1/00; G01N 25/72; G01N 25/28; G01N 25/32; G01N 33/225; G01N 33/02; H05K 7/20945; F24F 11/0012; F24F 2001/0052; F24F 2011/0093; F24F 11/022; H02M 1/32; H02M 1/38; H02M 1/53806; H01C 7/008; H01C 17/00; G01R 31/2642; G01R 31/048; G01R 31/40; G01J 5/004; G01J 5/043; G01J 5/0821; A47J 43/287; F16B 2/02; F16B 1/00; F16B 47/00; F16B 2001/0035; F16M 13/02; F16M 13/022

See application file for complete search history.

(56) References Cited

U.S. PATENT DOCUMENTS

2009/0030293 A1* 1/2009 Cooper .............. A61B 1/00016
                                                                      375/219

* cited by examiner

*Primary Examiner* — Manish S Shah
(74) *Attorney, Agent, or Firm* — Shumaker & Sieffert, P.A.

(57) ABSTRACT

Representative implementations of devices and techniques provide correction for temperature sensor measurement error. In an example, the temperature sensor includes an analog-to-digital converter (ADC). The ADC output is error corrected using an iterative digital post-processing technique.

16 Claims, 10 Drawing Sheets

A)

B)

CORRECTED TEMPERATURE SENSOR MEASUREMENT

BACKGROUND

The accuracy of integrated temperature sensors and ADCs can potentially be limited by semiconductor process parameter variations and/or environmental temperature variations. For example, integrated digital temperature sensors and ADCs that use a local voltage reference (such as a bandgap-based voltage reference) can be limited by the temperature variation of the voltage reference. Bipolar-based reference voltages may also be limited by the base-emitter voltage ($V_{BE}$) variations among the devices in a batch. Bandgap-based voltage references can have both linear and nonlinear temperature variations due to device physics and manufacturing tolerances.

To achieve higher accuracy, temperature variations of the voltage reference can be compensated, corrected, or calibrated. In some cases, an analog correction scheme can attempt to provide an accurate voltage reference. Generally, analog correction techniques rely on circuit compensation and may use analog calibration at one or two known temperatures, incurring test time costs. Further, additional voltage reference circuitry may increase complexity and product costs. If a higher accuracy external voltage reference is used, this may go against system-on-chip integration standards, and may incur additional system costs and additional package pins.

Some digital correction techniques can also use calibration at one or two known temperatures as well as real time temperature information. Test time costs may be present, depending on the techniques used. For accurate post-processing, the temperature needs to be known at the time of the ADC measurement. This is generally done with an additional temperature sensor. Thus, the high accuracy temperature sensor can incur power and silicon area costs. Further, such sensors typically use an ADC with a voltage reference, and then the temperature variation of this voltage reference needs to be compensated or corrected as well.

In such a case, a classic "chicken and egg" problem is presented. To measure temperature accurately, the voltage reference temperature variation needs to be compensated, and that requires the accurate temperature to be known. For one solution, the voltage reference may be used without digital correction. However, this can degrade the accuracy of the temperature sensor and in turn can degrade the ADC reference correction accuracy. For example, in ADC performance, after reference digital correction using a temperature sensor without reference correction, a ±0.03% (3σ) gain error inaccuracy can be seen from −40 to +85° C.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

DETAILED DESCRIPTION

Overview

Figure 1:
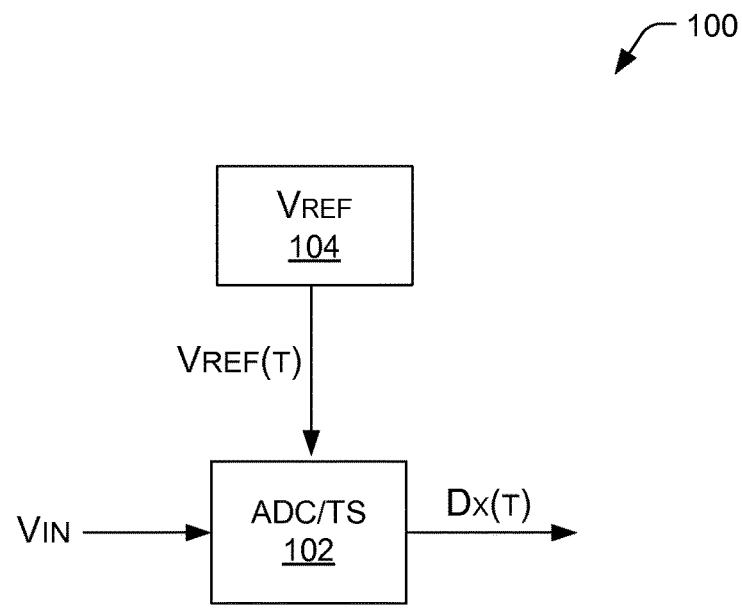
FIG. 1 is a block diagram of an example ADC/temperature sensor arrangement, wherein the techniques and devices disclosed herein may be applied.

Representative implementations of devices and techniques provide correction for temperature sensor measurement error. In an example, the temperature sensor (TS) includes an analog-to-digital converter (ADC). In an implementation, the ADC/TS output is error corrected using an iterative digital post-processing technique, which corrects for voltage reference temperature variation, for example.

In various aspects, two or more iterations of the digital post-processing technique are used to converge to the correct temperature value. In some implementations, the correct temperature value is reached (e.g., convergence) with three iterations or less. In various implementations, the iterations provide multiple digital corrections, according to a pre-defined algorithm. In an implementation, a pre-requisite for the iteration algorithm is that the digital corrections converge to the correct temperature value.

In one implementation, an initial temperature value is used to start digital correction of the measured temperature. The initially corrected temperature value is applied iteratively in subsequent digital corrections. In one example, the closer the initial value is to the actual temperature, the better the iteration convergence. In an example implementation, the "raw" output of the temperature sensor (i.e., without any correction) can be used as the initial temperature value.

In various implementations, digital post-processing is implemented using hardware and/or firmware. In an implementation, the disclosed iteration algorithm together with an accurate ADC (Temperature Sense functionality), based on digital correction of the voltage reference, offers the following advantages: 1) digital post-processing of the voltage reference temperature variation leverages digital signal processing (DSP) capability, and results in a high accuracy ADC and accurate temperature measurements; 2) no additional temperature sensor is needed for the technique, saving power and silicon area; 3) a single temperature measurement is done (e.g., multiple temperature measurements are not needed to achieve an accurate temperature measurement). In an implementation, this is because digital correction iterations are performed using digital signal processing, which can be implemented in firmware. The iterative computations are much faster relative to temperature sensor measurement time.

Relative to other solutions that currently use 2 or more ADCs, the disclosed devices and techniques open up the possibility of using a single high accuracy ADC for such applications.

Various implementations and techniques for correction of temperature sensor measurement error are discussed in this disclosure. Techniques and devices are discussed with reference to example devices and systems illustrated in the figures that use analog-to-digital converters (ADC), modulators, or like components. However, this is not intended to be limiting, and is for ease of discussion and illustrative convenience. The techniques and devices discussed may be applied to any of various modulator or ADC device designs, structures, and the like (e.g., successive-approximation ADC (SA-ADC), direct-conversion ADC, flash ADC, ramp-compare ADC, integrating ADC (also referred to as dual-slope or multi-slope ADC), counter-ramp ADC, pipeline ADC, sigma-delta ADC, time interleaved ADC, intermediate FM stage ADC, etc.), and remain within the scope of the disclosure.

Implementations are explained in more detail below using a plurality of examples. Although various implementations and examples are discussed here and below, further implementations and examples may be possible by combining the features and elements of individual implementations and examples.

Example Temperature Sensor Arrangement

FIG. 1 is a block diagram of an example high resolution digitizer (ADC/TS) arrangement 100, which can be configured as including an analog-to-digital converter (ADC) or a temperature sensor (TS), wherein the techniques and devices disclosed herein may be applied. In an implementation, the ADC/TS 100 provides digital information "Dx(T)" representing a measured voltage or temperature. In the implementation, an analog signal representing the voltage or temperature to be measured is received by the ADC/TS 100 in the form of an analog input voltage "Vin," or part of $V_{REF}$ (T) ($\Delta V_{BE}$ in FIG. 4) which is compared to a reference voltage "$V_{REF}$ (T)."

In an implementation, the reference voltage source $V_{REF}$ 104 generates the reference voltage $V_{REF}$ (T) based on one or more bandgap voltages (e.g., $\Delta V_{BE}$ and $V_{BE}$) that are derived from a bipolar core within the source Vref 104. For example, in an implementation, the reference voltage $V_{REF}$ (T) is generated based on a base-emitter voltage of one or more bipolar devices or a difference between base-emitter voltages of two or more bipolar devices.

In an implementation, the digital results Dx(T) are generated and output from the ADC portion of the ADC/TS 100. In various examples, the digital results Dx(T) are received and interpreted and/or applied by applications arranged to use the temperature measurement information Dx(T).

For the purposes of this disclosure, a digital result (e.g., digital output) may be described as a digital approximation of an analog input. For example, a digital result may include a digital representation that is proportional to the magnitude of the voltage or current of the analog input(s), at a point in time and/or over a selected duration. The digital representation may be expressed in various ways (e.g., base 2 binary code, binary coded decimal, voltage values, electrical or light pulse attributes, and the like).

In an implementation, the base-emitter reference voltage $V_{BE}$ and/or the difference in base-emitter voltages $\Delta V_{BE}$ are based on two or more bipolar devices within the bipolar core of the source $V_{REF}$ 104. The bipolar devices may include bipolar junction transistors, diodes, or like devices. Alternately, the bipolar devices of the bipolar core may comprise sub-threshold metal-oxide-semiconductor (MOS) devices, referencing the gate-source voltage ($V_{GS}$) of the MOS devices as the reference voltage, or like devices. In an alternate implementation, the reference voltage $V_{REF}$ (T) is generated or derived from other devices or by using other techniques. In alternate implementations, an example ADC/TS 100 may include fewer, additional, or alternate components, including additional stages of ADCs or different types of ADCs, for example.

Figure 2:
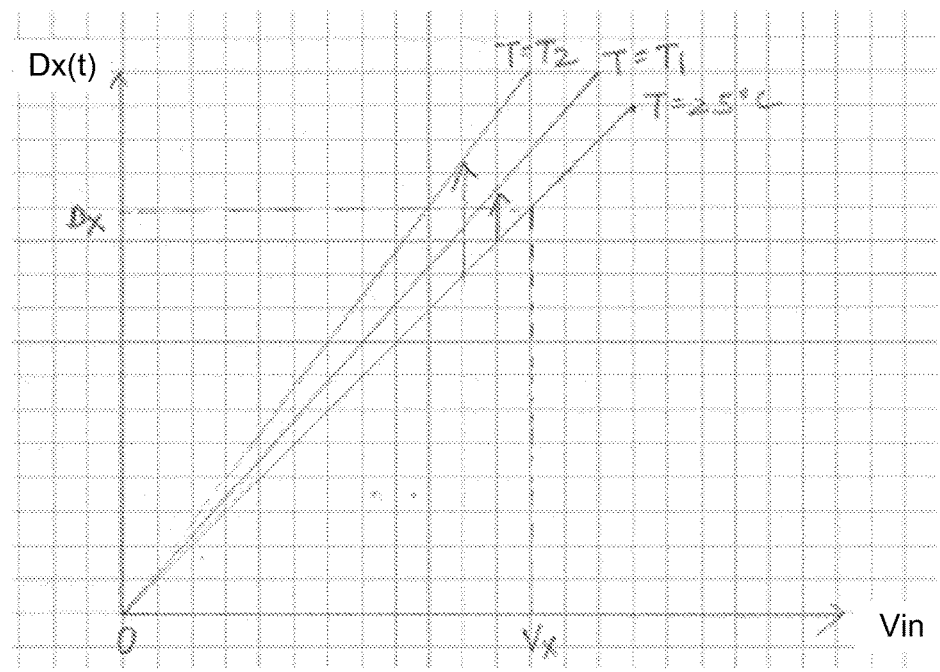
FIG. 2 is a graphical representation showing potential gain variations of the ADC of FIG. 1, based on temperature variations of the reference voltage.
Figure 3:
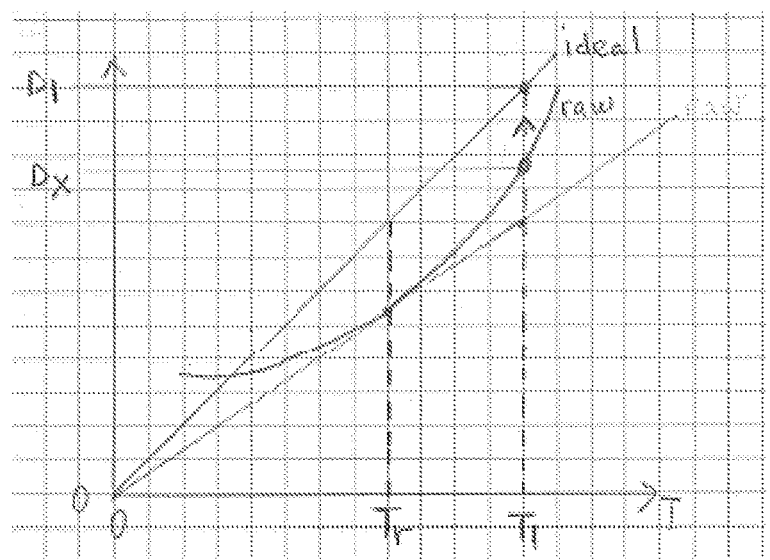
FIG. 3 includes two graphical representations showing potential digital temperature sensor gain error and non-linearity error, based on temperature variations of the reference voltage.
Figure 3:
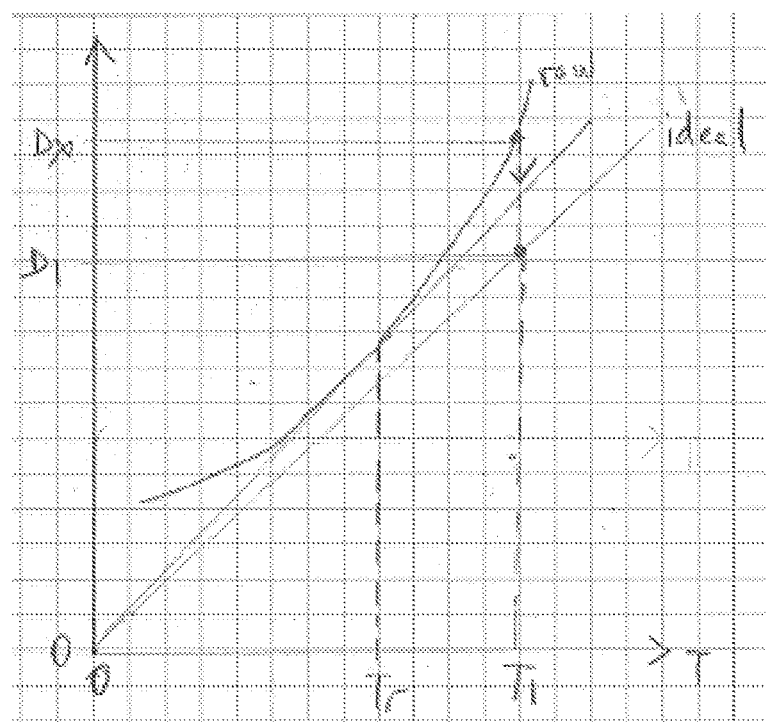

In various implementations, as shown in FIGS. 2 and 3, the voltage or temperature measurement of a digitizer arrangement (such as ADC/TS 100, for example) may include measurement error due to temperature variations of the reference voltage $V_{REF}$ (T). For example, as illustrated in FIG. 2, the value of Dx(T) ("Dx") can increase, for the same input voltage Vin ("Vx"), as the temperature of the voltage reference source $V_{REF}$ increases (based on the device(s) within the core of the source $V_{REF}$ 104). For example, the lines representing T=25° C., T=$T_1$, and T=$T_2$ represent temperature variations of the reference voltage $V_{REF}$ (T).

Further, as shown in FIG. 3, the graph at A) shows the case of an uncorrected ADC/TS 100 temperature transfer curve with negative linear and curvature errors. The graph at B) shows the case of an uncorrected ADC/TS 100 temperature transfer curve with positive linear and curvature errors. For example, at temperature T=$T_1$, the uncorrected result ("raw") is $D_X$. In an implementation, $D_1$ represents an ideal result (such as after digital correction, for example).

Example Implementations

Figure 4:
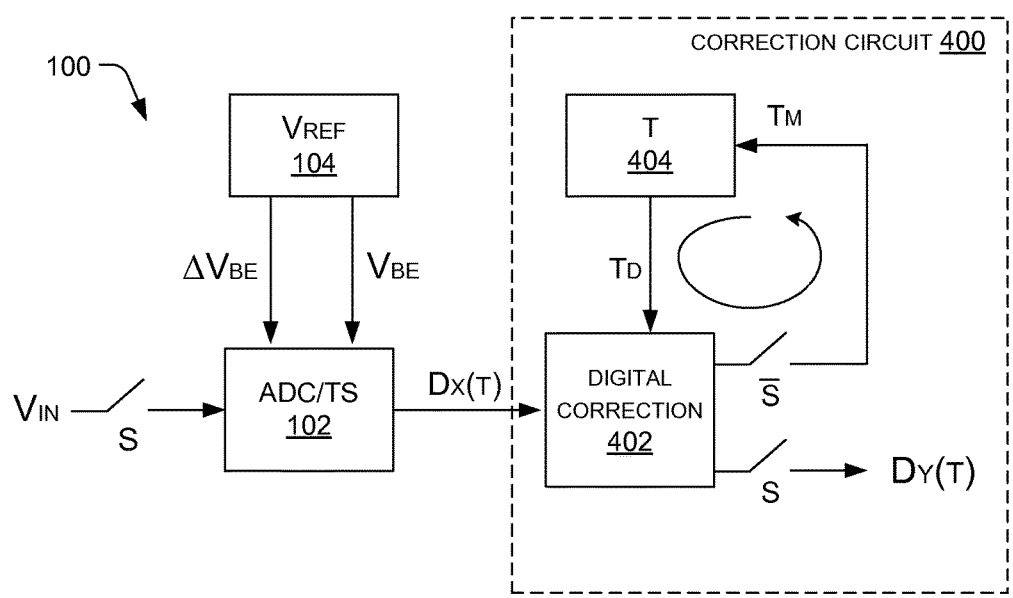
FIG. 4 is a block diagram illustrating an example digital correction arrangement for temperature variations of the reference voltage, according to an implementation.

In various implementations, as shown in FIG. 4, a correction circuit 400 may be used with the ADC/TS 100 to correct for the temperature variations of the voltage reference $V_{REF}$ (T), and thereby increase the accuracy of the ADC/TS 100. In an implementation, as illustrated in FIG. 4, the correction circuit 400 is arranged to receive the "raw" output Dx(T) of the ADC/TS 100, digitally process it, and output a corrected digital output value Dy(T). For example, the "raw" output Dx(T) generally includes a measurement value and an error value, as discussed above.

In the example ADC/TS 100 illustrated in FIG. 4, the reference voltage $V_{REF}$ (T) is represented by component bandgap voltage values (e.g., $\Delta V_{BE}$ and $V_{BE}$).

In an implementation, the digital correction performed by the correction circuit 400 is based on digital post-processing of the ADC/TS 100 results Dx(T), including multiplying Dx(T) by a mathematical function g(Td) that approximates the inverse of the voltage reference temperature variation. In an example, the mathematical function g(Td) can be a Taylor polynomial.

In another implementation, the correction circuit 400 uses an iterative technique to correct for the voltage reference temperature variation and to increase the accuracy of the ADC/TS 100 to measure temperature. For example, the correction circuit 400 iteratively multiplies the ADC/TS 100 digital results Dx(T) by g(Td) until convergence to the corrected (i.e., correct) result Tm. In an implementation, convergence is achieved when the error value falls below a predefined threshold value or tolerance ("tol"). For example, in various implementations, the magnitude of the error value is reduced with each iteration (until it converges).

In an implementation, referring to FIG. 4, the correction circuit 400 uses the following iterative technique, described in algorithmic form (with explanation comments):

```
Tm = Traw         # ADC/TS 100 measurement without correction #
Td=Traw           # choose initial temperature to start the iteration #
E=1               # initialize the error #
FOR E > tol DO    # iteration loop #
    T = Traw*g(Td)    # apply digital correction #
    E= T − Td         # update error #
    Td=T              # update correction temperature value #
END FOR
Tm = Td           # ADC/TS 100 measurement with correction #
```

In other words, in an implementation, the initial temperature value Td in the iteration routine may be the "raw" output of the ADC/TS 100, (e.g., Dx(T)), which is the uncorrected temperature measurement (in alternate implementations, another value may be used as the initial temperature value Td for the iteration routine). The error value "E" represents the difference between consecutive iterations of the corrected temperature measurement Tm. For a number of iterations, until the error value E converges or is less than or equal to the tolerance "tol," the temperature value Td is multiplied by the mathematical function g(Td) at the correction module 402, and the temperature error value E becomes the value of the result Tm less the current temperature value Td at the digital correction module 402.

The value of the result Tm becomes the new value for Td (e.g., for the next iteration), and the iterations continue (e.g., via the iteration loop shown in FIG. 4) until E is less than or equal to "tol." At convergence, the output of the ADC/TS 100 Tm is output from the digital correction module 402. This is illustrated in FIG. 4 with the switches S and S, which close the iteration loop until convergence, and then open the loop and output the current value for Td (e.g., as the corrected measurement value) at convergence which can then be used for $V_{REF}$ correction in ADC measurement of analog input Vin In an implementation, one module (e.g., the digital correction module 402, for example) is arranged to update the error value E with each iteration while the iteration loop is closed. In the implementation, the update includes subtracting the output signal Td from the result Tm of multiplying the output signal Td by the correction function g(Td). In another implementation, another module (e.g., T module 404, for example) is arranged to update the value of the output signal Td after each iteration. In the implementation, a value of a "next" output signal is updated to equal the result T of multiplying a value of a "previous" output signal Td by the correction function g(Td). In various implementations, one of the modules (402, 404), or another module or component of the correction circuit 400 is arranged to output the correct measurement value (e.g., the most recent value of Td) at convergence of the error value E.

In various implementations, the modules of the correction circuit 400 (e.g., the T module 404 and the digital correction module 402) may be implemented using digital signal processing components, such as processor(s), digital logic, digital filter(s), compression components, and the like. In alternate implementations, fewer, additional, or alternate components or modules may be included in the correction circuit 400.

The correction circuit 400 corrects for errors in temperature measurement by the ADC/TS 100, based on temperature variations of the reference voltage $V_{REF}$ (T). In an implementation, a pre-requisite for the iteration technique is that the digital corrections (e.g., performed by the correction circuit 400) converge to the correct (i.e., actual) temperature value. This is discussed both mathematically and numerically herein below.

Mathematical Analysis

For temperature T, the ADC/TS 100 output is Dx(T).

$$Dx(T)=FS*V_{PTAT}(T)/V_{REF}(T),$$

where FS is the full-scale factor, $V_{PTAT}$ (T) is the linear temperature input and $V_{REF}$ (T) is the reference voltage.

Define correction function f(T) such that $f(T)*V_{REF}(T)=V_{BEO}(Tr)$, where $V_{BEO}(Tr)$ is a constant value dependent on reference temperature Tr.

Apply digital correction:

$$Dy(T)=Dx(T)/f(T)=FS*V_{PTAT}(T)/\{V_{REF}(T)*f(T)\}$$

Define g(T)=1/f(T)

$$Dy(T)=FS*V_{PTAT}(T)*g(T)/V_{REF}(T)$$

$$V_{REF}(T)=V_{BE}(T)+\lambda*T=V_{BEO}(Tr)+a*T+c(T)=V_{BEO}(Tr)\{1+h(T)\}$$

where a is the residual linear term in $V_{BE}$ after Proportional to Absolute Temperature (PTAT) compensation: $a=\{V_{BE}(Tr)-V_{BE}\,nom(Tr)\}/Tr$. $V_{BE}\,nom(Tr)$ and $V_{BE}$ (Tr) are the nominal and actual silicon values of $V_{BE}(T)$ at temperature Tr. Due to manufacturing process variations, $V_{BE}\,nom(Tr)$ and $V_{BE}$ (Tr) are generally different, and h(T) includes c(T) the nonlinearity of $V_{BE}(T)$.

The value of a can be measured by single point temperature calibration:

$$h(T)=\{a*T+c(T)\}/V_{BEO}(Tr)$$

$$c(T)=\beta*(T-Tr-T*Ln(T/Tr))$$

$$\beta=(k/q)*(\eta-m),$$

where k is the Boltzmann constant, q is electric charge, and η is the saturation current temperature exponent.

The value of β depends on physical constants (k,q) as well as process parameters (η, m), which are best obtained by silicon characterization. The value m is the bipolar collector current temperature exponent (for a PTAT design, the value of m is typically less than 1 due to resistor temperature coefficient).

$$Dy(T)=FS*V_{PTAT}(T)*g(T)/V_{REF}(T)$$

$$=FS*V_{PTAT}(T)*g(T)/[V_{BEO}(Tr)\{1+h(T)\}]$$

$$=[FS*V_{PTAT}(T)/V_{BEO}(Tr)]*g(T)/\{1+h(T)\}.$$

For an ideal conversion, define:

$$T=[FS*V_{PTAT}(T)/V_{BEO}(Tr)]$$

$$Dy(T)=T*g(T)/\{1+h(T)\}.$$

Define temperature error:

$$Te(T)=Dy(T)-T=T*[g(T)/\{1+h(T)\}-1]$$

$$=T*[\{g(T)-h(T)-1\}/\{11+h(T)\}].$$

Define g(T)=1+p(T)

$$Te(T)=T*\{p(T)-h(T))\}/\{1+h(T)\}.$$

*For an ideal case with known temperature, and perfect correction*

$$p(T)=h(T) \text{ and } Te(T)=0.$$

However, since temperature is not known a priori, an initial value for Td is used:

$$Te(T)=T*\{p(Td)-h(T))\}/\{1+h(T)\}=T*e(T),$$

where $e(T)=\{p(Td)-h(T))\}/\{1+h(T)\}$.

Then, assuming an ideal correction case $p(T)=h(T)$:

$$e(T)=\{h(Td)-h(T)\}/\{1+h(T)\}$$

$$=[a*(Td-T)+c(Td)-c(T)]/[V_{BEO}(Tr)*\{1+h(T)\}],$$

$$Dy(T)=T+Te(T)=T+T*e(T)=T*\{1+e(T)\}.$$

In an implementation, for some initial value of $Dy(T)=Td$ $$Td=T*[1+e(Td)] \text{ *actual plus some error term*}$$

Substituting this, with iteration we can write:

$$e(i+1)=[a*T*e(i)+c(Td)-c(T)]/[V_{BEO}(Tr)*\{1+h(T)\}],$$

where $e(i)$ is $e(T)$ at iteration number i.

$$c(Td)-c(T)=c(T*\{1+e(Td)\})-c(T)$$

$$=\beta*T*[e(Td)*\{1-Ln(T/Tr)\}-(1+e(Td))*Ln(1+e(Td))].$$

Using a Taylor series approximation $Ln(1+x)\approx x-(x^2)/2+(x^3)/3$, and dropping cubic term yields:

$$c(T*\{1+e(Td)\})-c(T)$$

$$\approx -\beta*T*\{Ln(T/Tr)+e(Td)/2-e(Td)^2/2\}*e(Td)$$

$$=k1*e(Td)+k2*e(Td)^2+k3*e(Td)^3$$

where $k1=-\beta*T*Ln(T/Tr)$, $k2=-\beta*T/2=-k3$, $$e(i+1)\approx[a*T*e(i)+k1*e(i)+k2*e(i)^2+k3*e(i)^3]/[V_{BEO}(Tr)*\{1+h(T)\}]$$

$$e(i+1)=b1*e(i)+b2*e(i)^2+b3*e(i)^3$$

where $b1=(a*T+k1)/[V_{BEO}(Tr)*\{1+h(T)\}]=T*\{a-\beta*Ln(T/Tr)\}/[V_{BEO}(Tr)+aT+c(T)]$ $$\approx T*\{a-\beta*Ln(T/Tr)\}/V_{BEO}(Tr) \cdot b2\approx k2/V_{BEO}(Tr)=-\beta T/\{2*V_{BEO}(Tr)\}=-b3.$$

If the magnitude of b1, b2 and b3 are less than 1, then $e(i)$ gets smaller with every iteration and Td converges towards T. For instance, using some example values:

$$\beta=(k/q)*(\eta-m)V/°\ K=86\mu*(4-1)V/°\ K=258\mu V/°\ K$$

$$\approx 0.3m\ V/°\ K=0.0003 V/°\ K$$

$$a=\pm 40mV/Tr=\pm 40mV/300°\ K=\pm 0.13m\ V/°\ K\approx 0.2m\ V/°\ K$$

$$b1@T=600°\ K\approx 0.25$$

$$b1@T=100°\ K\approx 0.05$$

$$b2@T=600°\ K\approx -0.1$$

In an implementation, convergence is expected with two or more iterations. In one implementation, conversion occurs in three or less iterations. To verify that conversion has occurred to the correct value, the convergence can be verified using the following criterion:

$$e(T)=\{h(Td)-h(T)\}/\{1+h(T)\}$$

$$=[a*(Td-T)+c(Td)-c(T)]/[V_{BEO}(Tr)*\{1+h(T)\}]\to 0$$

which means $a*(Td-T)+c(Td)-c(T)\to 0$.

Figure 5:
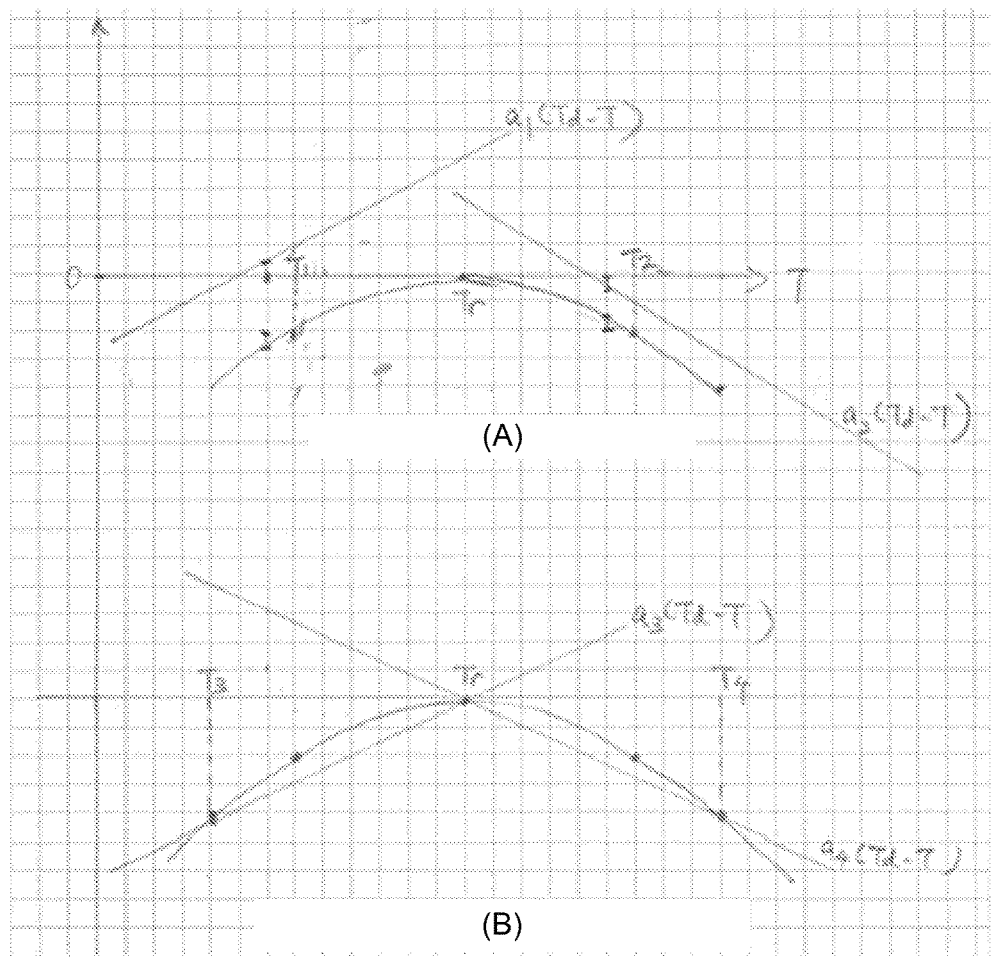
FIG. 5 includes two graphical representations showing example solution values based on the example digital correction arrangement of FIG. 4, according to various implementations.

Graphical illustrations in FIG. 5 show two possible solutions, which indicates that convergence to different values is possible. In FIG. 5(A), for the case of $T=T_1<Tr$ and $a_1>0$ ($a<0$), apart from a $1^{st}$ solution $T=T_1$, there is a $2^{nd}$ solution $T<T_1$. For the case of $T=T_2>Tr$ and $a_2<0$ ($a>0$), apart from a $1^{st}$ solution $T=T_2$, there is a $2^{nd}$ solution $T>T_2$. In FIG. 5(B), for the case of $T=Tr$ and $a_3>0$ ($a<0$), apart from the $1^{st}$ solution $T=Tr$, there is a 2nd solution $T=T_3$. For the case of $T=Tr$ and $a_4<0$ ($a>0$), apart from the $1^{st}$ solution $T=Tr$, there is a $2^{nd}$ solution $T=T_4$.

In various implementations, there are ways to avoid the occurrence of multiple solutions, for instance, by using different initial start values to check the final converged values. The mathematical analysis above was for the ideal case where $p(T)=h(T)$. In alternate implementations, for the more practical case of $p(T)$ approximating $h(T)$, it can be expected that similar behaviour occurs. In an implementation, the possible multiple solutions still converge to the correct value. For example:

$$Dy(T)=T*g(T)/\{1+h(T)\}$$

$$\text{Iteration}=>Dy(Ti+1)=T*g(Ti)/\{1+h(T)\}$$

$$\text{When } g(Ti)=1+h(T)=>Dy(Ti+1)=T$$

thus, convergence for both solutions. In the implementation, it is not necessary that $Ti=T$.

$$Dy(Ti+2)=Dy(Ti+1)=T$$

The same result is also received for an alternate representation:

$$Dy(T)=T*\{1+e(T)\}$$

$$e(T)=\{h(Td)-h(T)\}/\{1+h(T)\}$$

thus, convergence $h(Td)=h(T)$ for both solutions, and it is not necessary that $Td=T$, $$=>e(T)=0 \text{ and } Dy(T)=T.$$

Thus, the iteration converges.

Numerical Analysis

An example numerical analysis can be shown, using the equations:

$$Dy(T)=T*g(Td)/\{1+h(T)\}=T*[1+e(Td)].$$

For a fixed value of temperature $T=T_1$ $$Dy(T_1)=T_1*g(Td)/\{1+h(T_1)\}$$

$$=[T_1/\{1+h(T_1)\}]*g(Td)=Traw*g(Td)=T_1*[1+e(Td)],$$
and $$Z(Td)=1+e(Td)=g(Td)/\{1+h(T_1)\}=\{1+p(Td)\}/\{1+h(T_1)\}$$

To start, an initial value for Td is selected: Td=initial value near $T_1$. Then:

Compute $Z(Td)$
Update $Dy(T_1)=T_1*Z(Td)$
Update $Td=Dy(T_1)$
Iterate Updates.

Example results of the numerical analysis are shown graphically in FIGS. 6-9. For example, in the graphs of FIGS. 6-9, the vertical (Y) axis represents temperature error=$T_1*e(Td)$, and the horizontal (X) axis represents the iteration number. As shown in the graphs, $Ta=T_1$ is the actual temperature. Various initial values were selected for the initial temperature Td (labelled as Traw), as shown. $A=\pm 40$ mV is the residual linear term in $V_{BE}$ after Proportional to Absolute Temperature (PTAT) compensation [0042]

Figure 6:
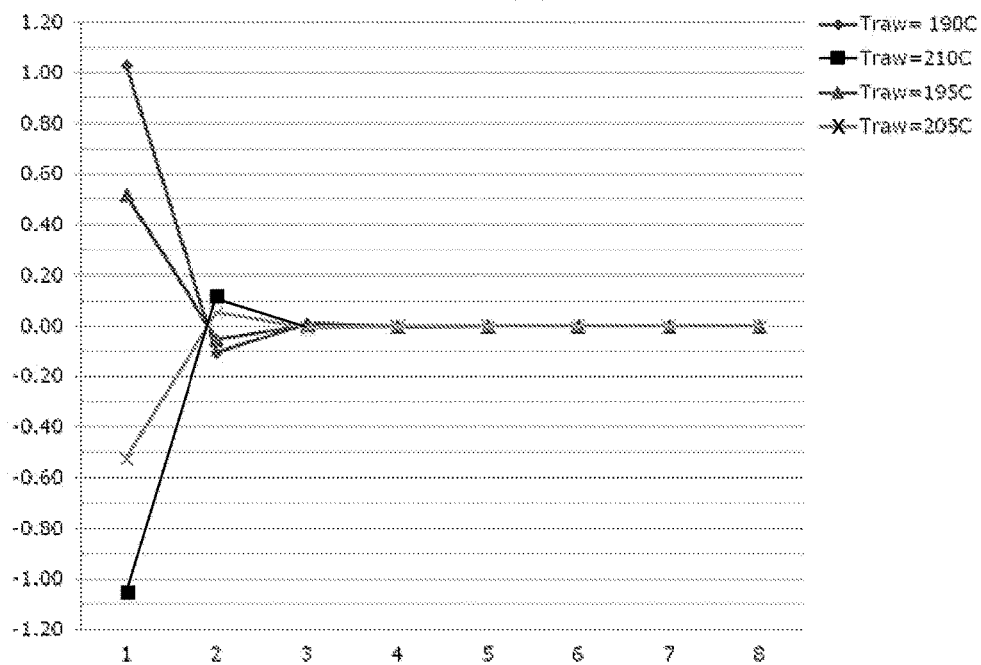
FIGS. 6-9 include graphical representations showing convergence of temperature sensor error for bandgap non-linearity term and its approximation using Taylor polynomial, according to some implementations.
Figure 6:
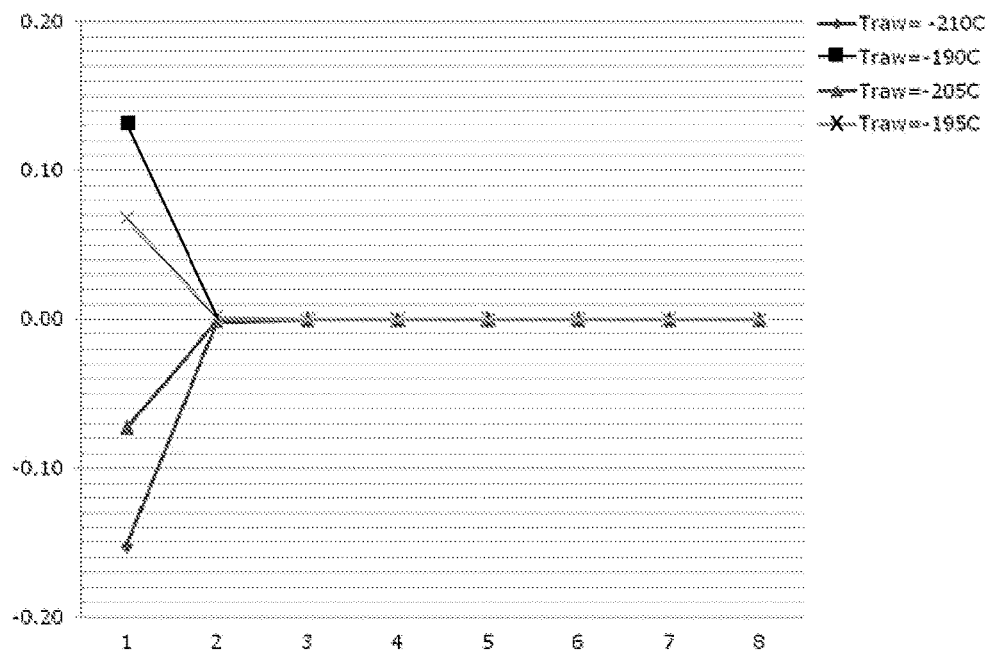
Figure 7:
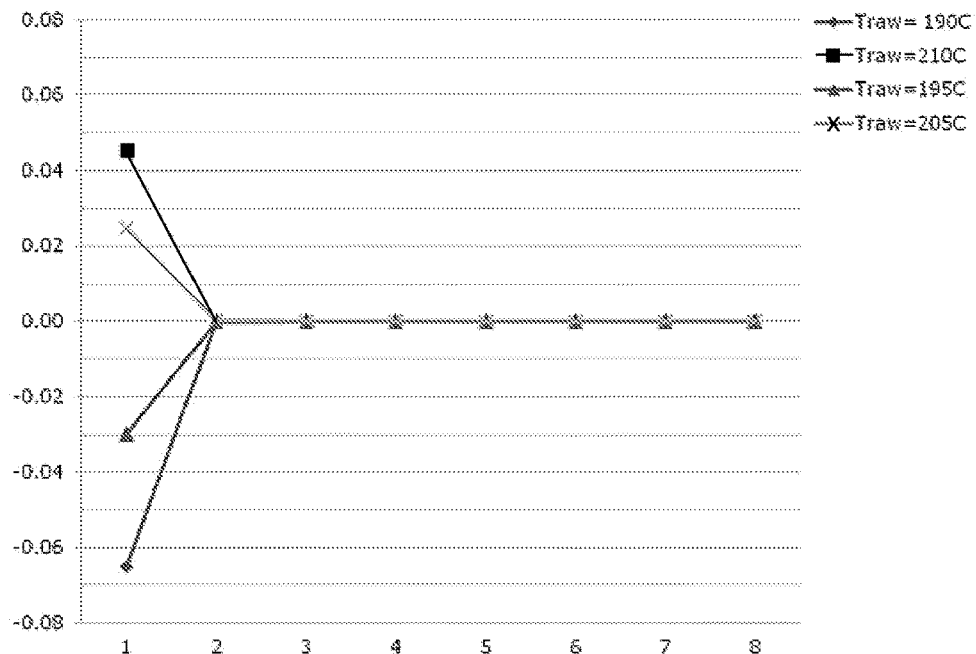
Figure 7:
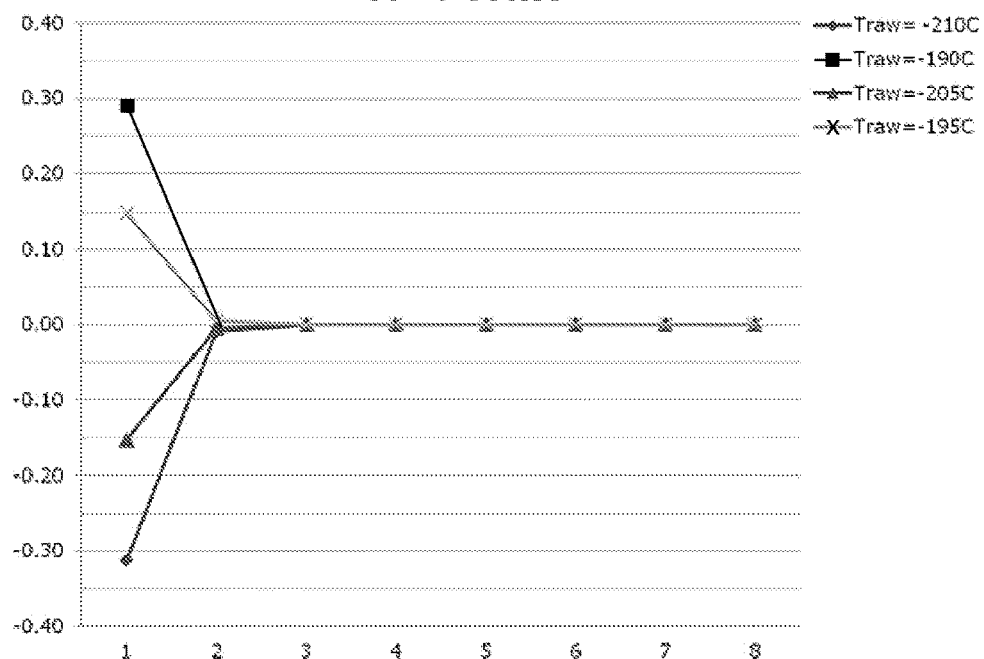
Figure 8:
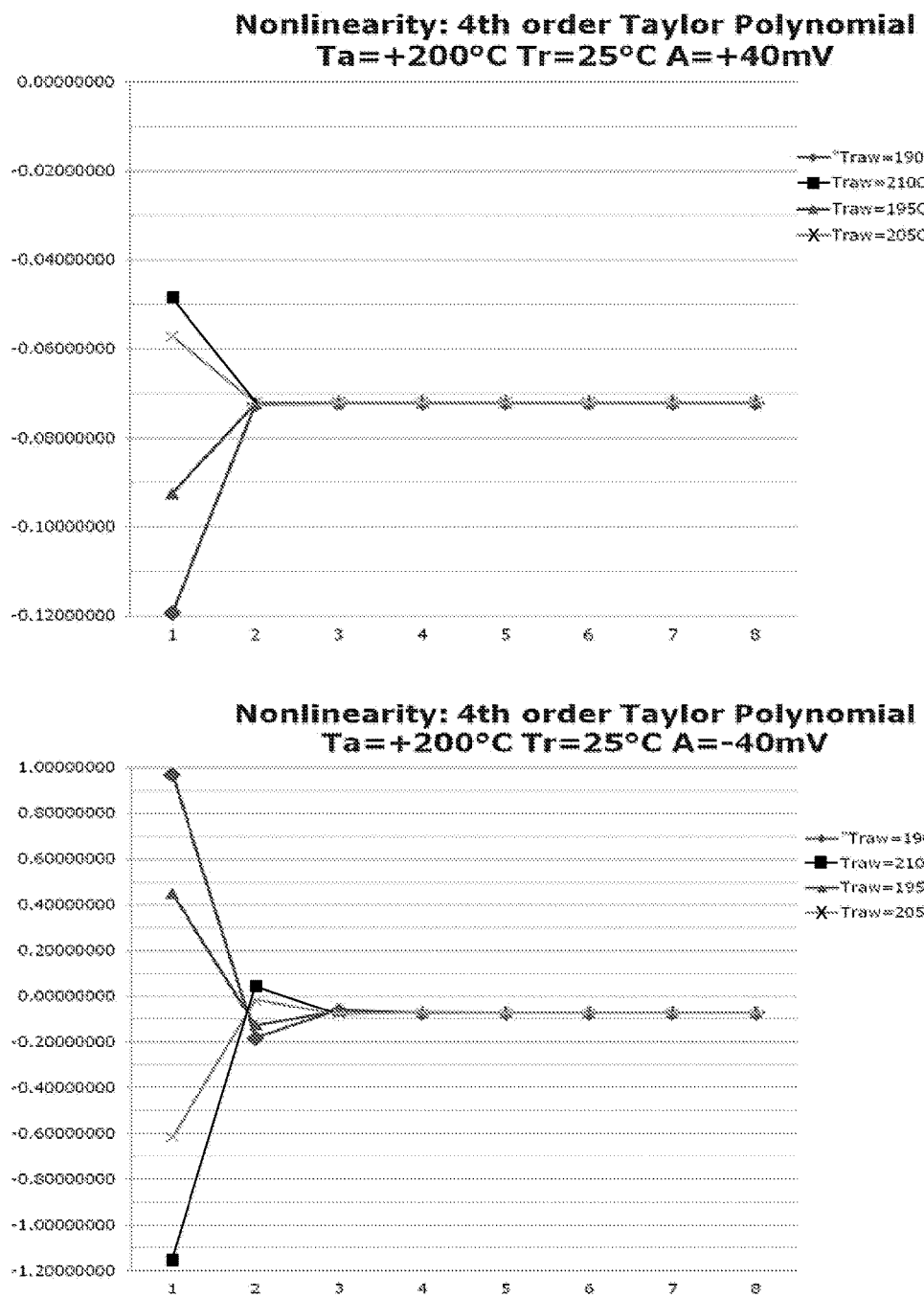
Figure 9:
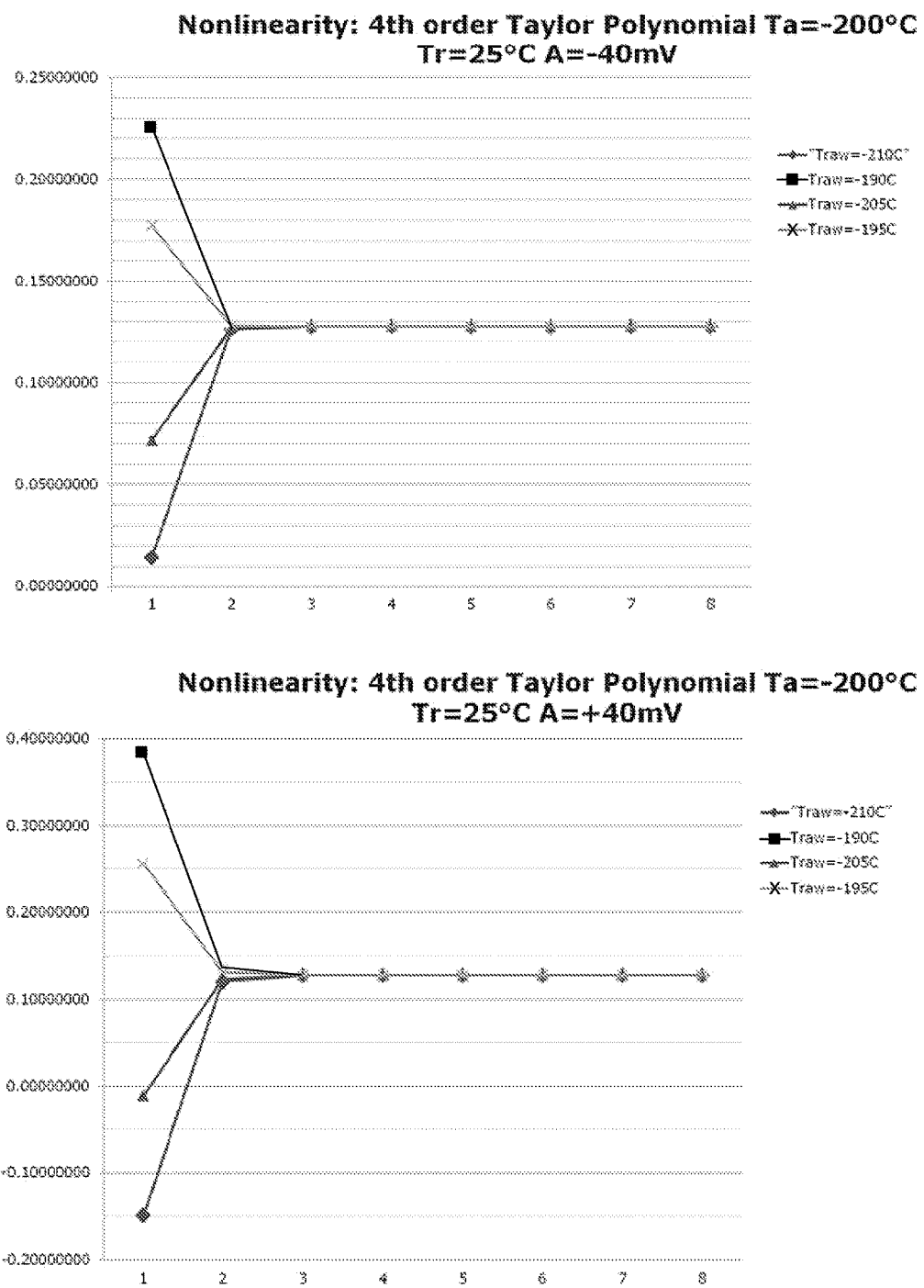

The graphs of FIGS. 6 and 7 represent the case where $p(T)=h(T)$. The graphs of FIGS. 8 and 9 represent the case where $p(T)=a$ $4^{th}$ order Taylor polynomial. As shown in FIGS. 6-9, in both cases, convergence is achieved within 3 iterations.

As shown in FIGS. 6-9, the converged error is larger in the example Taylor polynomial case, but the fact that the error is the same for different starting values would suggest that it is likely due to the difference between p(T) and h(T).

$$e(T)=\{p(Td)-h(T)\}/\{1+h(T)\}$$

$$=[p(Td)-\{a*T+c(T)\}/V_{BEO}(Tr)]/[1+h(T)] \to 0$$

Accordingly, the final value is the solution to the equation:

$$p(Td)-\{a*T+c(T)\}/V_{BEO}(Tr)=0$$

In other words, for a certain temperature $T_1$, the final converged value of Td is such that:

$$p(Td)-\{a*T_1+c(T_1)\}/V_{BEO}(Tr)=0$$

During the numerical analysis, no convergence to a different significant value was observed.

Example Implementations

In various implementations, different mathematical relationships may be used to perform the iterative correction technique by the correction circuit 400. Two example algorithms, using different mathematical relationships for the iterative digital correction function are shown below for illustration. For example, in the second algorithm, the function h(T) is approximated by a Taylor polynomial. In other implementations, other values and relationships may be used to arrive at the desired convergence.

| Algorithm (1) | |
|---|---|
| Tm = Traw | # ADC/TS 100 measurement without correction # |
| Td=Traw | # choose initial temperature to start the iteration # |
| g(T) = 1 + h(T) | # use mathematical function h(T) # |
| h(T) = {a*T + c(T)}/ V$_{BEO}$(Tr) | |
| c(T) = β*(T − Tr − T* Ln(T/Tr)) | |
| β = (k/q)*(η − m) | |
| E=1 | # initialize the error # |
| FOR E > tol DO | # iteration loop # |
|     T = Traw *g(Td) | # apply digital correction # |
|     E= T − Td | # update error # |
|     Td=T | # update correction temperature value # |
| END FOR | |
| Tm = Td | # corrected temperature # |

| Algorithm (2) | |
|---|---|
| Tm = Traw | # ADC/TS 100 measurement without correction # |
| Td=Traw | # choose initial temperature to start the iteration # |
| g(T) = 1 + p(T) | # p(T) is nth order Taylor polynomial approximation of h(T) # |
| E=1 | # initialize the error # |
| FOR E > tol DO | # iteration loop # |
|     T = Traw *g(Td) | # apply digital correction # |
|     E= T − Td | # update error # |
|     Td=T | # update correction temperature value # |
| END FOR | |
| Tm = Td | # corrected temperature # |

The techniques, components, and devices described herein with respect to the example ADC/TS 100 and the correction circuit 400 are not limited to the illustrations in FIGS. 1-9, and may be applied to other temperature sensor structures, devices, and designs without departing from the scope of the disclosure. The correction method can be applied to any measured parameter X with error h(X) and correction function g(X) in the form D(X)=[X/h(X)]*g(Xd) where D(X) is the measured value and Xd is some initial estimate of X provided g(Xd) converges to h(X). In some cases, additional or alternative components may be used to implement the techniques described herein. Further, the components may be arranged and/or combined in various combinations, while remaining within the scope of the disclosure. It is to be understood that an ADC/TS 100 or correction circuit 400 may be implemented as a stand-alone device or as part of another system (e.g., integrated with other components, systems, etc.).

Representative Process

Figure 10:
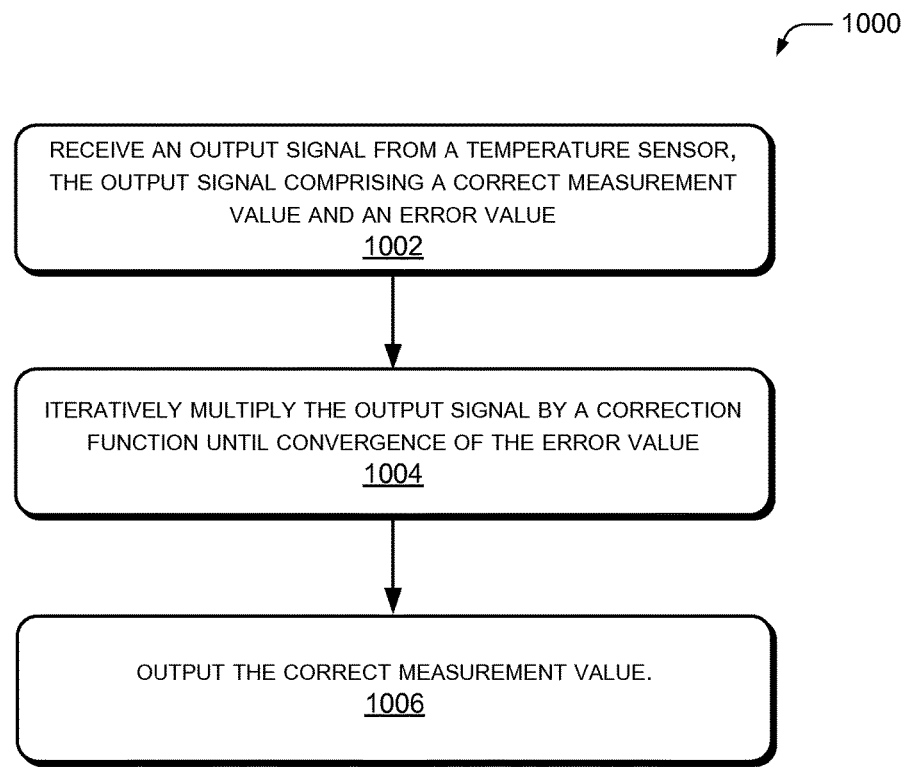
FIG. 10 is a flow diagram illustrating an example process for correcting temperature sensor measurement error, according to an implementation.

FIG. 10 is a flow diagram illustrating an example process 1000 for correcting temperature sensor measurement error, according to an implementation. The process 1000 describes using a high-resolution temperature sensor digitizer (such as the ADC/TS 100, for example) to make temperature measurements, and a correction circuit (such as correction circuit 400) to post-process the digital output of the temperature sensor to correct the output for error (e.g., due to temperature variation of the reference voltage). The process 1000 is described with reference to FIGS. 1-9.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

At block 1002, the process includes receiving an output signal from a temperature sensor (such as the ADC/TS 100, for example). In an implementation, the output signal comprises a correct measurement value and an error value. In an implementation, the process includes digitally post-processing the output signal from the temperature sensor to correct a temperature measurement represented by the output signal.

In an implementation, the error value is based on a temperature variation of a reference voltage of the temperature sensor. For example, in various implementations, the reference voltage is generated based on a base-emitter voltage of one or more bipolar devices or a difference between base-emitter voltages of two or more bipolar devices.

At block 1004, the process includes iteratively multiplying the output signal by a correction function until convergence of the error value approaching zero. In an implementation, the error value converges within three iterations, based on the correction function used. For example, in one implementation, the correction function is the mathematical inverse function of the temperature variation of the reference voltage. In another implementation, the correction function comprises a Taylor polynomial approximation of the inverse function. In an implementation, the process includes iteratively multiplying the output signal by the correction function until a magnitude of the error value falls below a predefined threshold value.

In various implementations, the process includes selecting an initial value for the temperature value (e.g., the output signal value) to be used with the iterative technique. In one implementation, the process includes selecting a value of an uncorrected temperature measurement signal (e.g., "Traw") of the temperature sensor as the initial value of the output signal for a first iteration.

In various implementations, the process includes updating a value of the output signal after each iteration. In the implementations, a value of a next output signal is updated to equal the result of multiplying the value of a previous output signal by the correction function. According to the process, the "next" output signal then becomes the "previous" output signal for a subsequent iteration.

At block 1006, the process includes outputting the correct measurement value. For example, in an implementation, the process includes outputting the value of the "next" output signal as the correct measurement value when the error value converges or is less than or equal to a predefined threshold value.

In alternate implementations, other techniques may be included in the process in various combinations, and remain within the scope of the disclosure.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. An apparatus, comprising:
   a first module arranged to receive an output signal from a temperature sensor, the output signal comprising a correct measurement value and an error value; and
   a second module arranged to iteratively multiply the output signal by a correction function until convergence of the error value, wherein the correction function comprises an approximation of an inverse of a temperature variation of a reference voltage of the temperature sensor.

2. The apparatus of claim 1, further comprising an iteration loop between the first module and the second module, the iteration loop arranged to be closed until convergence of the error value.

3. The apparatus of claim 2, wherein the first module is arranged to update the error value with each iteration while the iteration loop is closed, the update including subtracting the output signal from a result of the multiplying the output signal by the correction function.

4. The apparatus of claim 2, wherein the second module is arranged to update a value of the output signal after each iteration, wherein a value of a next output signal is updated to equal a result of multiplying a value of a previous output signal by the correction function.

5. The apparatus of claim 1, wherein one of the first module and the second module is arranged to output the correct measurement at convergence of the error value.

6. The apparatus of claim 1, wherein the reference voltage is based on a base-emitter voltage of one or more bipolar devices or a difference between base-emitter voltages of two or more bipolar devices.

7. The apparatus of claim 1, wherein the second module is arranged to iteratively multiply the output signal by the correction function until a magnitude of the error value is less than or equal to a predefined threshold value.

8. The apparatus of claim 1, wherein a magnitude of the error value is reduced with each iteration.

9. A correction circuit, the circuit comprising:
   a first module arranged to receive an output signal from a temperature sensor, the output signal comprising a correct measurement value and an error value; and
   a second module arranged to iteratively multiply the output signal by a correction function until convergence of the error value, wherein the second module is arranged to iteratively multiply the output signal by the correction function until a magnitude of the error value is less than or equal to a predefined threshold value.

10. The circuit of claim 9, further comprising an iteration loop between the first module and the second module, the iteration loop arranged to be closed until convergence of the error value.

11. The circuit of claim 10, wherein the first module is arranged to update the error value with each iteration while the iteration loop is closed, the update including subtracting the output signal from a result of the multiplying the output signal by the correction function.

12. The circuit of claim 10, wherein the second module is arranged to update a value of the output signal after each iteration, wherein a value of a next output signal is updated to equal a result of multiplying a value of a previous output signal by the correction function.

13. The circuit of claim 9, wherein one of the first module and the second module is arranged to output the correct measurement at convergence of the error value.

14. The circuit of claim 9, wherein the correction function comprises an approximation of an inverse of a temperature variation of a reference voltage of the temperature sensor.

15. The circuit of claim 14, wherein the reference voltage is based on a base-emitter voltage of one or more bipolar devices or a difference between base-emitter voltages of two or more bipolar devices.

16. The circuit of claim 9, wherein a magnitude of the error value is reduced with each iteration.

* * * * *